Sept. 26, 1933.  E. H. TAYLOR  1,928,118
SPIRAL PIPE
Filed Sept. 16, 1929
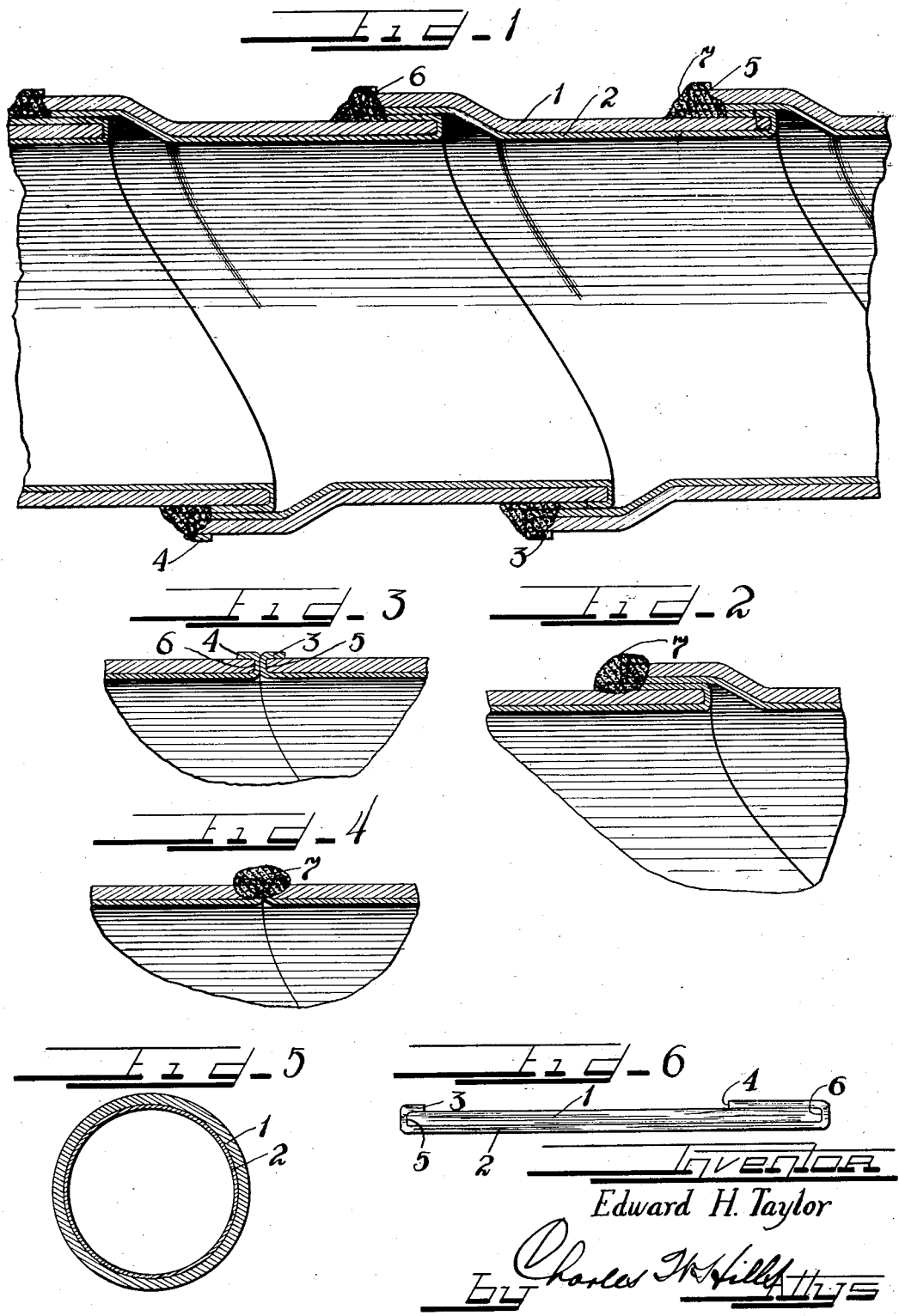
Inventor
Edward H. Taylor Patented Sept. 26, 1933

1,928,118

UNITED STATES PATENT OFFICE 1,928,118

SPIRAL PIPE

Edward H. Taylor, Chicago, Ill.

Application September 16, 1929
Serial No. 392,999

2 Claims. (Cl. 137—75)

This invention relates to pipes, and more particularly to a spiral pipe.

Spiral pipe is ordinarily made of sheet iron, mild steel, or other material that will give a strong body to the pipe. These materials are not satisfactory, however, when it becomes necessary to use the pipe or conduit for acids, alkalines, and other corrosive agents. For this reason, the material of which the pipe is constructed should be one having non-corrodible properties. If the desired bodily strength is to be obtained in the pipe, a material of suitable thickness must be used. If the pipe is constructed entirely of a material having non-corrodible properties, its cost becomes very high.

It is, therefore, an object of this invention to provide an improved pipe for conducting corrosive fluids.

A further object of this invention is to provide a pipe having sufficient bodily strength to stand up under use and be substantially non-corrodible.

Other and further important objects of this invention will be apparent from the disclosures in the accompanying drawing and the following specification:

The invention (in a preferred form) is illustrated in the drawing and hereinafter more fully described.

On the drawing:

Figure 1 is a longitudinal section through a spiral pipe embodying this invention.

Figure 2 is a fragmentary view in section showing the preferred form of joint used in the improved pipe.

Figure 3 is a fragmentary view in section showing a modified joint.

Figure 4 is the same as Figure 3 except that the welding on the joint is shown.

Figure 5 is a transverse section of the pipe showing the substantially non-corrodible lining.

Figure 6 is an end elevational view of a strip of the pipe material showing the substantially non-corrodible lining secured to the body strip.

As shown on the drawing:

In the illustrated embodiment of this invention, there is shown in Figure 1 a spirally wound strip 1 of the ordinary metal used in spiral pipes; which serves as a body for the pipe and is made of suitable thickness to give the pipe whatever strength is desired. A lining is provided on the inner surface of the pipe by a spiral strip 2 of substantially non-corrodible metal. This lining, if desired, need be only a fraction of the thickness of the body strip, since its principal purpose is to protect the body strip from whatever corrosive agent is being conducted through the pipe. These two strips are initially formed into a unit strip stock which permits both of them to be spirally wound at the same time. The strip stock is made by facing the bottom surface of the body strip with a strip of substantially non-corrodible material which is secured in place by folding its edges 3 and 4, Figure 6, over the edges 5 and 6 respectively of the body strip and clamping the inwardly turned ends against the top surface thereof. The unit stock strip is wound into a spiral with the adjacent edges of the convolutions thus formed either overlapping, as shown in Figure 2, or abutting, as shown in Figure 3, depending upon the type of joint desired, and a spiral seam is made by welding 7 which also serves to additionally secure the substantially non-corrodible strip to the body strip and seals the joint. It is to be noted that in either type of joint the body metal is completely protected by the substantially non-corrodible metal of the facing or lining strip, the joint contact being between the substantially non-corrodible strips forming the lining of the pipe.

By the use of this invention, an improved pipe is provided having sufficient strength to stand up in use and at the same time be suitable for conducting corrosive agents.

I am aware that many changes may be made, and numerous details of construction may be varied through a wide range without departing from the principles of this invention, and I therefore do not purpose limiting the patent granted hereon, otherwise than as necessitated by the prior art.

I claim as my invention:

1. In a pipe, a spirally wound body strip, a spirally wound lining strip having its adjacent lateral portions deflected outwardly between the adjacent edges of said body strip and back against the outer surface of said body strip, and a weld for securing said deflected portions together and to said edges.

2. In a spiral pipe, a spirally wound body strip having overlapping joint portions, a separate lining strip covering the inner surface of the body strip, said lining strip having one edge folded over one edge of the body strip, and the other edge portion of said lining strip extending between the overlapping joint portions, said overlapping joint portions being welded together.

EDWARD H. TAYLOR.